Patented June 1, 1948

2,442,610

UNITED STATES PATENT OFFICE 2,442,610

PRECIPITATION OF HYDROUS VANADIUM OXIDE

Walter F. Meister, Elizabeth, N. J., assignor to National Lead Company, New York, N. Y., a corporation of New Jersey No Drawing. Application March 5, 1946, Serial No. 652,233

6 Claims. (Cl. 23—140)

This invention relates to a new and useful method of precipitating vanadium compounds. It relates in particular to an improved process for the substantially complete hydrolysis of soluble vanadate into high quality, easily processed hydrous vanadium oxide.

In the practice of the art of vanadium recovery, vanadium-containing ores and residues which have been previously ground and which are to be processed for their vanadium content, are often roasted with sodium salts to convert the vanadium values to water soluble compounds, specifically sodium vanadates, which are extracted in a subsequent leaching operation. The hydrolysis of the resulting leach liquor by neutralization with acid accompanied by heating is an established procedure in the art of precipitating out the vanadium in the form of a filterable hydrous oxide. Yet certain obstacles have not heretofore been adequately overcome in hydrolyzing vanadium from such solutions. The present invention springs from a search for adequate means of overcoming the hindrance encountered in these imperfected steps of this procedure. The advantageous features of the method of the present invention, in addition to rapidly giving a high recovery of vanadium in a state of relatively high purity, lie in its avoidance of certain well known difficulties accruing from the tendency of the precipitate to form viscid, gummy flocs which adhere to the hydrolyzing apparatus, thus interfering with normal hydrolysis and preventing easy handling and washing of the precipitate and easy cleaning of the apparatus and equipment.

The phenomenon of sticking and adherence of the precipitated hydrous vanadium oxide flocs to the inside walls and other parts of the precipitation apparatus, such as coils and agitator, is invariably encountered when the required (calculated) amount of acid is added to the sodium vanadate solution under agitation, or in a manner which causes turbulence and substantial mixing of the two liquors. This sticking is encountered whether the contact surface is made of ceramics, bricks, glass or suitably resistant metals or alloys.

It has now been found, that the difficulties of sticking and adherence of the hydrous vanadium oxide precipitate heretofore encountered in the art may be easily overcome according to the present invention, by the simple expedient of a proper method of mixing through which by a controlled initial diffusion an effective nucleation is induced.

Accordingly, it is the primary object of the present invention to provide a method for obtaining by hydrolysis of vanadate solutions, particularly solutions of alkali metal vanadates, easily filterable, non-sticky precipitates of hydrous vanadium oxide. This and other objects will become apparent from the following description.

Vanadate liquors, e. g. sodium vanadate liquors, which are obtained by direct leaching of alkali treated ores or materials poor in vanadium are low in vanadium content. While the concentration of the vanadate liquor is not critical to the method of this invention, best results are obtained with solutions of fairly high vanadium content. Thus, we have found that solutions upward of 10 grams per liter, vanadium, and preferably higher are more satisfactory than more dilute solutions. Such concentrated solutions may be obtained by countercurrent leaching of the alkali treated materials, and, if necessary, by subsequent further concentration by evaporation.

Hydrous vanadium oxide is soluble under both acid and alkaline conditions, and the problem of complete precipitation of the vanadium values is a matter of establishing the correct pH in the solution. Experiments have shown that by neutralizing with acid, preferably a mineral acid, to a pH of 2.0–3.0, preferably 2.5, which must be maintained, substantially complete hydrolysis is obtained. Higher or lower pH will give incomplete or no precipitation of vanadium. It has also been found that high concentration of salts, such as alkali metal, chloride and/or sulfate, to a certain degree will suppress the solubility of the hydrous vanadium oxide and thereby aid in its complete recovery.

The invention in its broadest aspects contemplates bringing together an alkali metal vanadate solution and a solution of a neutralizing acid in such manner that substantial mixing is avoided and two layers are formed, allowing the two solutions to stand quiescent to promote diffusion and formation of nucleating particles of hydrous vanadium oxide in the diffusion zone, then slowly heating and agitating the solutions to complete hydrolysis of hydrous vanadium oxide.

When the two solutions are brought together, there is not formed a clearly defined interface as is the case, for example, when oil and water are brought together but, on the contrary, there is an immediate tendency for mutual diffusion of the two solutions to form what has been termed above a "diffusion zone." From the moment of contact of the two solutions and during the period in which diffusion is allowed to take place, i. e. while the solutions are standing quiescently, particles of hydrous vanadium oxide are formed which act as nuclei.

More specifically, the present invention consists in bringing together in a suitable vessel the alkaline vanadate solution and the neutralizing acid liquor, preferably sulfuric acid, in such amounts as will produce at the completed mixing a pH of about 2.5 in the final liquor, and in such a manner that at the beginning the two liquors form two layers. Excellent results are obtained when the required sulfuric acid is preferably of a specific gravity sufficiently high to exceed that of the vanadate liquor, thus forming the bottom layer, but this is not consequential to the practice of the invention. Preferably the vanadate liquor is first placed in the vessel, whereupon the calculated amount of sulfuric acid is carefully added without unduly disturbing the vanadate solution and without causing a substantial mixing of the two liquors. This can easily be accomplished by slowly pouring the heavier acid liquor in a stream through the unagitated, lighter vanadate liquor, or down the inside wall of the vessel without agitation, or, even better, by carefully introducing the acid through a pipe below the sodium vanadate liquor, or up through a valve in the bottom of the vessel. The addition of the acid may be made at any convenient temperature i. e., the temperature of the acid and the vanadate liquor is not critical, but preferably between about 25° C. and 80° C., the latter temperature approximating that ordinarily used at leaching and of the finished vanadate leach liquor. The two solutions diffuse slowly into each other causing the formation of a layer of hydrous vanadium oxide in the diffusion zone between the two liquors. The hydrous vanadium oxide flocs formed in said zone serve in the further hydrolysis, after mixing, as nuclei upon which the rest of the vanadium values will hydrolyze. Likewise any hydrous vanadium oxide formed as a result of contact with the acid during addition may also form the basis for nuclei. The charge is left strictly without mechanical or other agitation for say 10 to 15 minutes, thus avoiding rapid mixing (or a too rapid evolution of $CO_2$ in the event the vanadate liquor contains carbonate, which will cause turbulence and which will disturb the slow diffusion). Stirring is then begun at a rate sufficiently slow to preserve visibly at least a part of the nuclear precipitate. Heat is simultaneously furnished to accelerate the hydrolysis. Temperatures of from 90° C. to the boiling temperature of the mix will cause the complete or substantially complete hydrolysis of the vanadium values within a comparatively short period of time. The physical characteristics of the precipitate will vary with the concentration of the mix, more loosely flocculent at low than at high vanadate concentration. In any event the precipitate will not stick or adhere to the apparatus and will filter and wash easily. The non-sticking and non-adhering characteristics of the precipitate obtained according to this invention is attributed to the persistance of proper nuclear particles or centers of precipitation in the charge. The hydrous vanadium oxide subsequently hydrolyzed is precipitated upon these centers as loose non-viscid, non-gummy flocs. In the absence of such hydrolysis centers, or in the presence of an inadequate number of nuclei or improper nuclei, which are likely to form in the absence of controlled neutralization, the hydrous vanadium oxide appears as a sticky precipitate. It has been observed that such precipitate invariably is attracted to the surfaces of the precipitation apparatus and that it will adhere thereto. Subsequently formed flocs will hydrolyze thereon, rather than on themselves.

While the foregoing description of the process should be adequate for one skilled in the art to practice the invention, a typical application of the invention will be described below in more detail. It should be understood that the following example is given for illustrative purposes only and should not be construed as placing any limitation on the scope of the invention, which should be interpreted as broadly as possible in view of the appended claims.

*Example*

80 liters of sodium vanadate liquor having a specific gravity of 1.20 at 80° C., obtained by countercurrent leaching of alkali-roasted, vanadium-containing, titanium-bearing magnetite, and containing 17 grams per liter of vanadium, were placed in a ceramic tank equipped with heating coils and mechanical agitator. The pH of the liquor was 9.0. The total amount of sulfuric acid required for the neutralization of the vanadate liquor to a pH of 2.5 was determined from the titration of a small measured portion of vanadate liquor with normal sulfuric acid to that pH.

To the completely still vanadate liquor at 80° C. was then added without agitation the calculated amount of sulfuric acid in the form of a 62% $H_2SO_4$ solution, having a specific gravity of about 1.526, at 80° C. by slowly pouring it down a pipe attached to the inner wall of the apparatus. Through an opening in the pipe near the bottom of the tank, the sulfuric acid flowed out underneath the vanadate solution. Because of its greater specific gravity the acid remained on the bottom forming a separate lower layer. An immediate diffusion took place at the contact boundary, causing a precipitate of hydrous vanadium oxide to form. After allowing the diffusion to proceed for 15 minutes, agitation was started and the batch brought to 105° C in 2 hours at which time 99 per cent of the vanadium was hydrolyzed in the form of loosely held flocs which did not stick or adhere to the walls of the apparatus or to the coil or agitator. The precipitate was easily filtered and washed to give a product of high purity.

When repeating the example, but adding the acid under agitation so as to cause mixing and rapid neutralization, a sticky precipitate was formed which adhered to the walls of the apparatus, to the coils and to the agitator shaft and blades. This precipitate was difficult to remove and did not filter and wash easily. The final product was also less pure than that obtained by the process of this invention.

The foregoing description has been given for illustrative purposes only, and the appended claims cover such modifications of the invention as may be effected within the skill of the art.

I claim:

1. Method for hydrolyzing vanadate solutions which comprises bringing a solution containing alkali metal vanadate in contact with a solution of a neutralizing acid to form one layer consisting substantially of vanadate solution and another layer consisting substantially of the acid solution with a diffusion zone between the two, maintaining the said two layers in quiescent contact to precipitate, by diffusion of said solutions, a layer of particles of hydrous vanadium oxide in said zone, then heating and agitating the solutions until the vanadium content is substantially completely precipitated as filterable, hydrous vanadium oxide.

2. Method for hydrolyzing vanadate solutions which comprises pouring into a solution containing alkali metal vanadate a sulfuric acid solution of higher specific gravity than the specific gravity of said vanadate solution to form an upper layer consisting substantially of vanadate solution and a bottom layer consisting substantially of the acid solution with diffusion zone between the two, maintaining the said two layers in quiescent contact to precipitate, by diffusion of said solutions, a layer of particles of hydrous vanadium oxide in said zone, then heating and agitating the solutions until the vanadium content is substantially completely precipitated as filterable, hydrous vanadium oxide.

3. Method for hydrolyzing vanadate solutions which comprises pouring into a solution containing alkali metal vanadate a solution containing sufficient sulfuric acid to reduce the pH of the said vanadate solution to a value between about pH=3.0 to about pH=2.0 and having a higher specific gravity than the specific gravity of said vanadate solution to form an upper layer consisting substantially of vanadate solution and a bottom layer consisting substantially of the acid solution with a diffusion zone between the two, maintaining the said two layers in quiescent contact to precipitate, by diffusion of said solutions, a layer of particles of hydrous vanadium oxide in said zone, then heating and agitating the solutions until the vanadium content is substantially completely precipitated as filterable, hydrous vanadium oxide.

4. Method for hydrolyzing vanadate solutions which comprises pouring into a solution of alkali metal vanadate containing at least about 10 grams vanadium per liter a solution containing sufficient sulfuric acid to reduce the pH of the said vanadate solution to a value between about pH=3.0 to about pH=2.0 and having a higher specific gravity than the specific gravity of said vanadate solution to form an upper layer consisting substantially of vanadate solution and a bottom layer consisting substantially of the acid solution with a diffusion zone between the two, maintaining the said two layers in quiescent contact to precipitate, by diffusion of said solutions, a layer of particles of hydrous vanadium oxide in said zone, then heating and agitating the solutions until the vanadium content is substantially completely precipitated as filterable, hydrous vanadium oxide.

5. Method according to claim 4, wherein the alkali metal vanadate is sodium vanadate.

6. Method for the manufacture of hydrous vanadium oxide which comprises, adding a solution of a mineral acid to a solution of alkali metal vanadate without mixing so that stratification of the two solutions occurs, maintaining said solutions in quiescent contact to precipitate hydrous vanadium oxide in a diffusion zone between the strata, then agitating to mix the two solutions together and heating, to precipitate substantially all the vanadium content of the alkaline metal vanadate solution as hydrous vanadium oxide.

WALTER F. MEISTER.

REFERENCES CITED

The following references are of record in the file of this patent:

UNITED STATES PATENTS

| Number | Name | Date |
| --- | --- | --- |
| 1,119,929 | Davis | Dec. 8, 1914 |
| 1,399,245 | Bleecker | Dec. 6, 1921 |